SCR CIRCUIT FOR TERMINATING AN X-RAY EXPOSURE AT A PRECISE POINT

Filed Aug. 18, 1966

INVENTORS
HERBERT E. DANIELS
DONALD E. GRAVES
BY
Ralph G. Hohenfeldt
ATTORNEY

INVENTORS
HERBERT E. DANIELS
DONALD E. GRAVES
BY Ralph D. Hohenfeldt
ATTORNEY 3,428,809

SCR CIRCUIT FOR TERMINATING AN X-RAY EXPOSURE AT A PRECISE POINT

Herbert E. Daniels, Brown Deer, and Donald E. Graves, Wauwatosa, Wis., assignors to General Electric Company, a corporation of New York Filed Aug. 18, 1966, Ser. No. 573,355
U.S. Cl. 250—95 4 Claims
Int. Cl. H05g *1/28, 1/38*

ABSTRACT OF THE DISCLOSURE

A circuit for terminating an X-ray exposure at a precise point has the primary winding of an X-ray transformer connected in the A-C input line of a diode bridge. An output line from the bridge has an inductor and a first controlled rectifier (SCR) in series and constitutes a unidirectional return line to the bridge. A large capacitor is connected between the anode of the first SCR and the anode of a second SCR. The capacitor is held charged by a D-C source. The first SCR is made nonconductive, to terminate an exposure, by removing its gate voltage and applying a signal to the gate of the second SCR which then conducts to apply reverse biasing voltage of the capacitor across the first SCR. The transformer load current is then diverted from the first SCR to the capacitor to let the first SCR recover its nonconductive state. A damped oscillation demagnetizes the transformer core.

This invention relates generally to X-ray apparatus and particularly to an improved means for controlling the X-ray generation or exposure interval of an X-ray tube.

The trend in diagnostic X-ray techniques is to use higher X-ray tube voltages and currents and correspondingly shorter exposure intervals. The density of radiographic film depends on the product of tube current and exposure time, so large variations in density now result from small errors in the exposure time interval. Therefore, it has become increasingly important to control the interval precisely. Film density differences may be perceived as a result of as little as ten per cent difference in exposure time. This means that controlling the exposure interval to within one-half cycle of the sixty cycle line frequency or to within 1/120 of a second or any fixed amount is no longer satisfactory because some high tube current techniques call for exposure intervals that extend over one or more half-cycles and a small part of a final half-cycle while others may require exposure intervals of only a small definite fraction of one-half cycle.

Accordingly, the primary object of this invention is to provide means for selecting any desired exposure time increment and for reproducibly terminating exposure intervals at any desired point without being restricted to a predetermined fixed or minimum time interval. A corollary to this object is, of course, the provision of means for also initiating exposure intervals at a predetermined and reproducible time.

It has been customary to control the X-ray interval by either switching the X-ray transformer primary with an electromagnetic relay or by using an X-ray tube having a control grid. Both of these methods have disadvantages. For instance, the heavy duty relays required have considerable inertia or time lag which necessitates use of circuits for anticipating occurrence of the interval terminating signal lest the relay operate late and thereby extend the exposure unduly. This is especially problematical for very short intervals such as for less than a line frequency half-cycle. Use of an X-ray tube with a control grid is not a wholly satisfactory alternative because of minimum power handling capacity and resulting high voltage transients and because such schemes require pulse generating circuits and highly insulated pulse transformers which result in complicating the control circuits and increasing the cost of the X-ray apparatus significantly. Using vacuum tubes to switch the high voltage secondary circuit is another alternative for controlling large amounts of power, but these switches require complicated control circuits and are prone to transient voltage problems.

Accordingly, it is another object of this invention to provide simplified and comparatively inexpensive means, for precise control of X-ray exposure intervals, which eliminate the need for operating heavy duty electromagnetic relays at high speed, minimize the number of relays of all kinds, eliminate high voltage switching, and act so rapidly and reproducibly as to make timing compensation and anticipation circuits unnecessary.

Achievement of the foregoing and other more specific objects will appear from time to time throughout the course of this specification.

In general terms, the invention is characterized by connecting the primary of the high voltage X-ray transformer in the circuit with an A-C source by means of either a rectifier bridge in conjunction with a first silicon controlled rectifier (SCR) or SCR's connected in inverse parallel. The A-C circuit through the bridge or other circuit arrangement includes the SCR. The gate circuit of the first SCR is energized through a high speed reed relay or semiconductor triggering circuit that is controlled by a second SCR which is in turn controlled by a source of pulses which are synchronized with the power line and in a definite phase relationship to the voltage applied on the first SCR through the diode bridge. When the second SCR is turned on by pulses from the source, this SCR fires the first SCR substantially instantaneously, in a few microseconds, in which case the X-ray transformer is energized in a predetermined time relationship to the instant of zero line voltage.

An X-ray exposure timer controls the gate electrode of a third SCR which in turn operates another electromagnetic reed relay or semiconductor switch when rendered conductive. The last-named relay is adapted to operate a fourth SCR which is connected in series with a capacitor across the anode and cathode of the first or conduction initiating SCR. Thus, firing of the fourth SCR causes a reverse bias voltage to be applied to the first SCR to render it nonconductive in a few microseconds. At the same time, the capacitor provides a path for diverting load current from the first SCR. The total time to turn on and turn off the first SCR may amount to about one-hundred microseconds so the X-ray conduction intervals may be made of almost any duration within the approximate eight milliseconds that elapse during one-half of a line frequency cycle or the exposure interval may be any whole number of half-cycles plus a part of a half-cycle.

A more detailed description of the invention will now be set forth in reference to the drawings in which.

Figure 1:
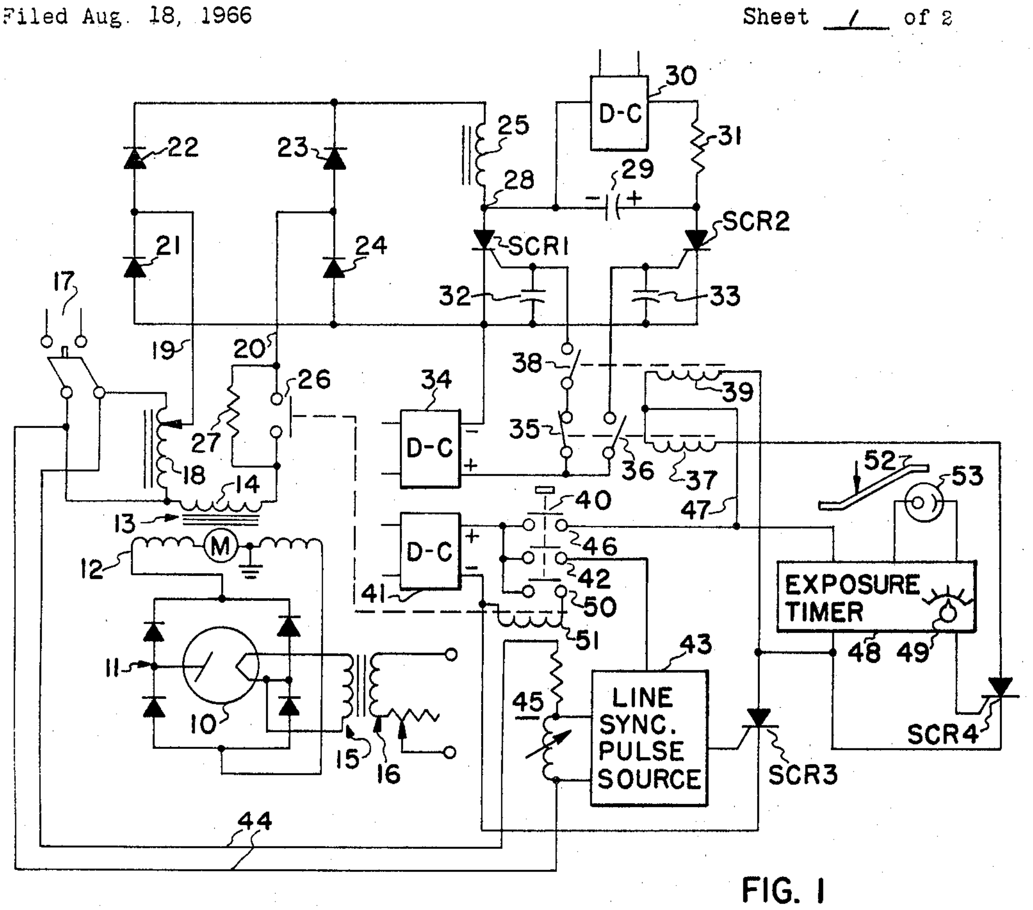
FIGURE 1 is a circuit diagram of a portion of an X-ray tube control system which embodies the present invention.

In FIGURE 1 the anode and cathode of an X-ray tube 10 are connected across the D-C terminals of a full-wave high voltage rectifier bridge 11. The bridge is supplied with A-C from the secondary winding 12 of a high voltage transformer 13 whose primary 14 is energized periodically for the duration of an X-ray exposure interval. The filament of X-ray tube 10 is supplied with heating current from the secondary of a low voltage transformer 15 in the primary of which there is a rheostat 16 that is adjustable to control the emissivity of the filament and, hence, the current through the X-ray tube. All of the components and circuitry described thus far are conventional.

An A-C power line 17 supplies an autotransformer 18 which has an adjustable tap for selecting the voltage to be applied to primary winding 14 of the X-ray transformer. Opposite lines 19 and 20 from the autotransformer connect to the midpoints of a diode bridge circuit which comprises diodes 21, 22, 23, and 24. In series with the bridge is an inductor 25 and the anode-to-cathode path of a controlled rectifier which for brevity is called SCR1. Also in series with a wire 20 and with the primary winding 14 of the X-ray transformer is a safety contactor 26 which is bridged by a high resistance 27 for transient suppression.

One may see that at any instant that line 19 from the autotransformer is positive, if SCR1 is rendered conductive and if it is assumed that safety contactor 26 is closed, there will be a current path beginning with line 19 from the autotransformer and continuing in series through diode 22, inductor 25, SCR1, diode 24, line 20, contactor 26, primary winding 14 then back to autotransformer 18. When the other side of autotransformer 18 becomes positive, current flows through the reverse path including primary winding 14, contactor 26, diode 23, inductor 25, SCR1, diode 21 and then back to the autotransformer on line 19. Conduction through SCR1 is in the same direction for either polarity of autotransformer 18.

Normally, between X-ray exposures, SCR1 is not conductive but there is, nevertheless a pulsating D-C voltage continually applied to the anode of SCR1 such as at point 28. X-ray tube 10 may be energized to start an exposure interval by rendering SCR1 conductive which requires applying a positive signal to its gate electrode. As is well-known, SCR1 will continue to conduct even though its anode-to-cathode voltage passes through zero provided an adequate positive trigger signal is applied to its gate electrode. If the gate signal is removed during a half-cycle of conduction, the SCR will continue to conduct for the remainder of the half-cycle or until its current passes through zero.

In accordance with the present invention, conduction by SCR1 may be stopped at any desired instant by applying a reverse bias voltage from the cathode-to-anode of the SCR to deprive it of load current. The reverse bias voltage is obtained in this case from a large storage capacitor 29 which is constantly charged from a D-C source 30 through a limiting resistor 31. Capacitor 29 is connected in series with an SCR2 which is rendered conductive only at the point at which it is desired to terminate the exposure interval. Upon this event, the positive side of capacitor 29 is connected through SCR2 to the cathode of SCR1 and the negative side of the capacitor to the anode of SCR1 in which case the latter is reverse biased and rendered nonconductive almost instantaneously provided there is no positive signal being applied to its gate electrode. The reverse bias voltage source, capacitor 29, has a negative left plate at the instant that SCR2 is fired and SCR1 becomes reverse biased. Thus, the positive load current is diverted from the anode of SCR1 at this instant and into the negatively charged side of the capacitor so the SCR1 can pass through current zero and cutoff. One consequence is that SCR2 may have a lower rating than SCR1 since SCR2 conducts load current for a very short period only. Another consequence is that the capacitor discharges more rapidly for higher electron beam currents through the X-ray tube, or in other words, for higher load currents. This is so because the time constant for the capacitor 29 and the X-ray tube power supply becomes shorter for large loads because the reflected impedance of the load is lower when the load current is heavier.

It is apparent that there are alternate discharge paths for capacitor 29 when SCR2 is made conductive. One path starts at the positive side of capacitor 29 and continues in series through SCR2, diode 24, diode 23, inductor 25 and then to the negative plate of the capacitor. However, the time constant of the combination of capacitor 29 and inductor 25 is long enough to allow SCR1 to recover; that is, the time constant must exceed the turn off time of SCR1.

The small capacitors 32 and 33 which are respectively connected between the gate and cathode of each SCR1 and SCR2 are for nullifying voltage transients and thereby avoiding false triggering of the SCR's.

The manner in which SCR1 is rendered conductive, just before zero voltage, to start any exposure interval and the manner in which SCR1 is rendered nonconductive at any desired point during one or more half-cycles of conduction will now be described. The starting trigger signal to SCR1 is supplied from a D-C source 34 through a normally closed contact 35 of a magnetic reed relay switch which also has a normally open contact 36 and an electromagnetic operating coil 37. Contact 35 is in series with a normally open contact 38 of another reed relay that is actuated by coil 39. By inspection, it can be seen that upon closure of contact 38, a D-C triggering voltage from source 34 will be applied between the gate electrode and the cathode of SCR1, rendering the latter conductive. Contact 38, is of course, closed by energization of magnet coil 39. When an exposure interval is to be terminated, an appropriate signal is applied to magnet coil 37, thus opening reed switch contact 35 and closing contact 36 so as to connect the D-C source 34 between the gate electrode and cathode of SCR2 for discharging capacitor 29 in the manner and for the purposes described above, that is, for reverse biasing and blocking SCR1. It is well-known that reed switches such as those operated by magnet coils 37 and 39 are extremely fast and respond to control signals within a matter of a few hundred microseconds so that the SCR's are switched on or off within a period of time which is small as compared with the eight or so millisecond duration of a half-cycle at power line frequency.

Figure 3:
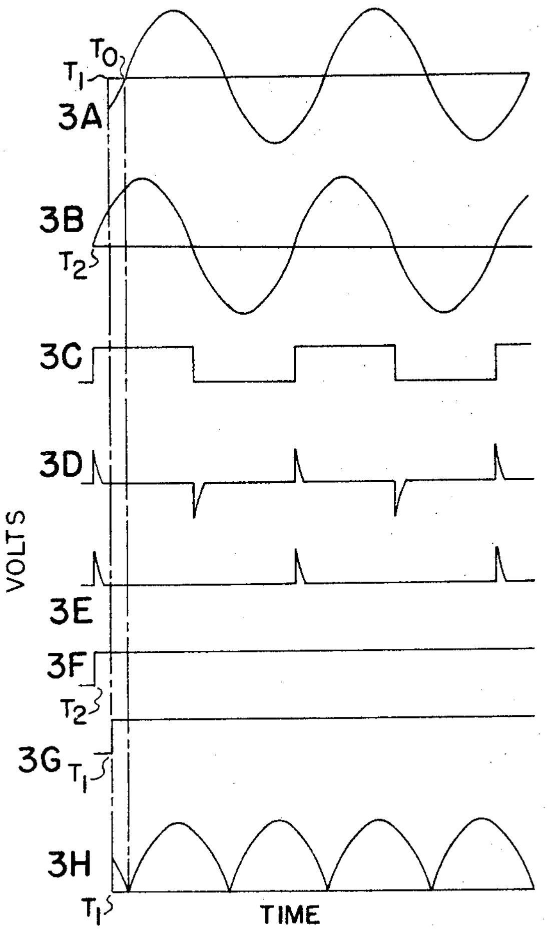
FIGURE 3 illustrates the relationship between certain voltages that occur in the circuits and are useful for explaining operation of the invention.

An exposure is initiated by manually depressing a hand switch 40. Among other things, this connects a D-C source 41 through contacts 42 of the hand switch to a line synchronized pulse source 43 which performs several electronic functions that will be generally described in connection with FIGURE 3 as well as FIGURE 1. Pulse source 43 is connected by means of lines 44 to the same A-C supply to which autotransformer 18 is connected. The input voltage to the pulse source 43 is phase-shifted with respect to the line voltage by an LC phase shift circuit 45. FIGURE 3B represents the input voltage wave to the pulse source 43 and it will be seen to pass through zero initially earlier than the power line wave form represented in FIGURE 3A. Pulse source 43 includes circuitry that may be devised by anyone who is reasonably skilled in electronics and for that reason such circuitry will only be described with respect to its function rather than its structural details. In any event, it will be observed that the phase-shifted wave shown in FIGURE 3B leads to production of square wave pulses which are shown in FIGURE 3C as being in phase with the sinusoidal wave forms of FIGURE 3B. The square waves are differentiated as illustrated in FIGURE 3D and the positive waves are used to control a unijunction oscillator, not shown, which yields only the positive pulses of FIGURE 3E that coincide with the beginning of every positive going half-cycle in FIGURE 3B. The pulse of FIGURE 3E are supplied to the gate electrode of SCR3 from pulse source 43. Any time that pulse source 43 is turned on by operation of hand switch 40, SCR3 will begin conducting and continue to conduct because positive voltage will be applied to its anode through a path leading from D-C source 41 through a contact 46 of the manual switch, a common line 47, through relay coil 39, then through the anode-to-cathode path of SCR3 and back to the negative side of D-C source 41. The time at which SCR3 begins conducting is illustrated in FIGURE 3F and this coincides with the time when relay coil 39 becomes conductive to actuate reed switch contact 38 and start an exposure interval. FIGURE 3G shows that there is an elapse of a few microseconds between time $T_1$ when SCR1 becomes conductive and the time $T_2$ at which SCR3 and relay coil 39 are energized. FIGURE 3H shows the pulsating D-C voltage that exists at point 28, on the anode of SCR1, and it further illustrates that SCR1 becomes conductive at $T_1$ which is slightly before the time at which line voltage passes through zero as seen in FIGURE 3A.

Any of the well-known types of exposure timers such as that symbolized by block 48 may be employed to terminate the X-ray exposure interval. One may see that exposure timer 48 is adapted to begin a timing interval only after pulses are provided by source 43 and SCR3 has become conductive. This is so because the negative side of the line from exposure timer 48 connects to the anode of SCR3 to complete the path to the negative side of D-C source only when SCR3 is conductive. Thus, timing of the interval always begin coincidentally with SCR1 being rendered conductive. As is customary, exposure timer 48 has a means, such as a potentiometer knob 49 or other time selector means, for selecting an interval or sequence of interval enduring for less than half-cycle to several seconds depending on the technique being carried out by the radiologist. In this case, when the exposure timer has measured the desired interval, it produces a signal which is applied to the gate electrode of SCR4. When the latter conducts, a positive voltage is applied to termination relay coil 37 through a path starting at D-C source 41 and including contact 46 of the manual switch 40, line 47, coil 37, SCR4 and then back through SCR3 to the negative side of D-C source 41. As explained earlier, when reed switch operating coil 37 is energized, its contact 35 opens to remove the control voltage from the gate of SCR1 and its contact 36 closes to apply control voltage to the gate electrode of SCR2 in order to discharge capacitor 29 and block SCR1 instantaneously. When hand switch 40 is released, the circuit is reset and readied for another exposure interval. It should be noted that hand switch 40 is also provided with a contact 50 that operates a relay coil 51 which in turn controls the safety contact 26 in the primary circuit of X-ray transformer 13. The hand switch is made so that contact 50 closes safety contactor 26 before hand switch contacts 42 and 46 close and so that safety contact 26 opens after contact 42 and 46 open.

The instantaneous termination of an exposure interval upon command is needed for fast and reproducible phototiming or any other application where precise amounts of X-ray energy must be controlled. For example, in phototiming, the enclosure for the film cassette includes a fluorescent sheet material 52 through which passes the same X-radiation that exposes the film. The duration and intensity of the light emitted from this layer is integrated by a photocell 53, which in practice is usually a photomultiplier tube, and which measures the integrated X-ray intensity and acts through the exposure timer 48 to terminate the interval by firing SCR4. In instances when image intensifier tubes, not shown, are used, a signal may be derived from the cathode current thereof for controlling the exposure timer and thereby terminating the interval. In these applications and in ordinary radiography, the present invention enables obtaining any desired interval.

Figure 4:
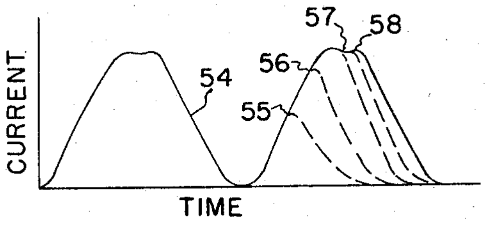
FIGURE 4 shows the relationship between voltage on the X-ray tube and time for several exposure intervals of different duration.

FIGURE 4 shows one situation where a full A-C pulse 54 is applied to the X-ray tube and the interval is terminated at any one of a number of desired points in the next pulse such as 55, 56, 57, or 58 at which points the oscilloscope reveals that the voltage applied to the X-ray transformer declines to zero on command. Of course, there may be any number of full half-wave pulses such as 54 preceding the final partial pulse or there may be only one partial pulse that may be cut-off at any point in time that is desired. Because of the phase relations discussed in connection with FIGURE 3, all X-ray exposure intervals are initiated slightly before the line frequency voltage passes through zero so as to minimize voltage transients on the transformer and to also begin energizing the transformer when the flow of magnetizing current is at something other than its peak value.

Figure 2:
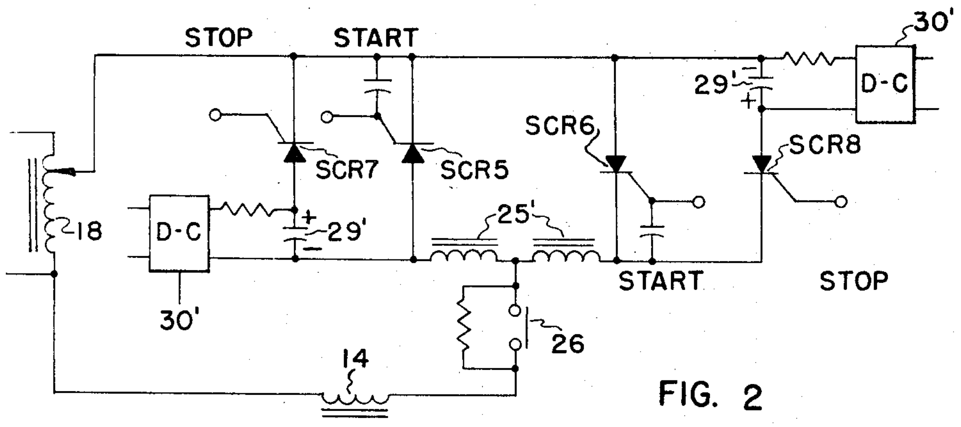
FIGURE 2 is a circuit diagram illustrating how the X-ray transformer may be supplied through controlled rectifiers connected in inverse parallel relationship as an alternative to supplying the same through a diode bridge as in FIGURE 1.

FIGURE 2 illustrates an arrangement where the primary winding 14 of the X-ray transformer is supplied from autotransformer 18 through turn-on or load SCR's 5 and 6 which are connected in inverse parallel. The circuit for turning on SCR5 and SCR6 may, in this embodiment, be the same as that used to turn on SCR1 in FIG. 1, except that two sets of control relays 37 and 39 and their associated contacts are needed for controlling the two turn-on SCR's as well as the turn-off SCR's 7 and 8.

In the circuit of FIGURE 2, alternate half-cycles at power line frequency are conducted alternately through SCR5 and SCR6. The conduction paths are symmetrical. When the top of autotransformer 18 is positive, and SCR6 is energized, current flows from the autotransformer through SCR6, closed contact 26, primary winding 14 of X-ray transformer, and back to the autotransformer. When polarity of the autotransformer reverses, current will flow through the symmetrical path including SCR5.

A timing interval is terminated in this embodiment as in the embodiment previously discussed by applying a triggering signal to the gate of SCR7 and SCR8 in which case the reverse bias voltage of capacitors 29' are applied across the anode-to-cathode path of SCR5 and SCR6 to terminate their conduction.

Figure 5:
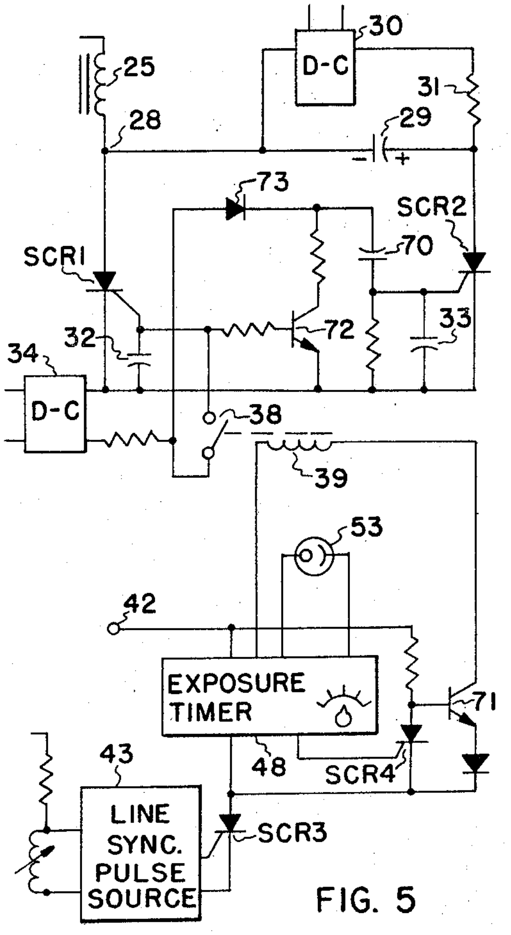
FIGURE 5 is an alternative embodiment of the invention.

FIGURE 5 is an alternative embodiment of the invention which uses a magnetic reed relay to start an exposure and uses an electronic circuit to trigger SCR2 to stop the exposure and the flow of current through SCR1. This minimizes even the short delay that results from triggering SCR2 by closing a second reed relay which requires a little more timing than opening such relay. In FIGURE 5 parts that are the same as those in FIGURES 1 and 2 are given the same reference numerals.

In FIGURE 5, capacitor 70 is charged to the voltage of D-C source 34 prior to initiating an exposure. Closing the negative line by triggering SCR3 with pulse source 43 allows current flow from positive source 42 through reed relay coil 39 and transistor 71, thereby closing relay contact 38 to initiate an exposure. This also turns on transistor 72 to discharge capacitor 70.

At the end of an exposure, SCR4 turns on, turning off transistor 71, and reed relay contacts 38 beging opening. This removes the positive gate voltage from SCR1 and turns off transistor 72 as well. With transistor 72 off, there is no bypass for capacitor 70 so it recharges quickly through a low impedance path from D-C source 34 through diode 73. The recharging pulse triggers the gate of SCR2 so that the latter conducts and discharges capacitor 29 which reverse biases SCR1 and provides an alternate path for load current for terminating the exposure in the manner described earlier in reference to FIGURES 1 and 2.

Although embodiments of the invention have been described in sufficient detail to enable those skilled in the art to reproduce the invention, it should be understood that the invention may be variously embodied in X-ray control circuits and it is to be limited only by interpretation of the claims which follow.

It is claimed:

1. An X-ray exposure interval timing circuit comprising:

(a) an electric power source and an X-ray transformer primary winding connectable thereto, (b) a rectifier bridge having an A-C input terminal connected to the X-ray transformer primary winding and said bridge having an output line through which current flows unidirectionally, (c) a first controlled rectifier having anode, cathode, and gate terminals and having its anode-to-cathode path in series with the primary winding, (d) a second controlled rectifier having anode, cathode and gate terminals, (e) an inductor connected serially in the output line with the anode of said first controlled rectifier, (f) a capacitor connected between the anode of the second controlled rectifier and to a point intermediate the inductor and the anode of the first controlled rectifier, the cathodes of each controlled rectifier being connected to each other, (g) a D-C source connected to charge the capacitor, (h) a switching circuit for applying an exposure initiating signal to the gate of the first controlled rectifier to thereby start it conducting, (i) said switching circuit being adapted to remove said exposure initiating signal from the first controlled rectifier and to apply an exposure terminating signal to the gate of the second controlled rectifier at the end of an exposure interval, (j) the said exposure terminating signal causing said second controlled rectifier to conduct and apply the capacitor voltage to reverse bias the first controlled rectifier for terminating its conduction interval.

2. The invention set forth in claim 1 including:

(a) an X-ray exposure interval timer means, (b) a switch means in the timer circuit whereby to start an exposure interval when the switch means is rendered conductive, the said switch means having a control terminal, (c) a source of electric pulses that are synchronized with and in predetermined phase relationship with the voltage of the first named electric power source, (d) the said pulse source being connected to the control terminal for rendering the switch means conductive and starting the timer simultaneously, (e) the aforementioned exposure initiating switching circuit including a D-C source and a reed relay having a magnetic operating coil, a contact of said reed relay being connected between said D-C source and magnetic operating coil of said reed relay being in series circuit with the aforementioned switch means in the timer circuit, whereby the latter switch means may only become conductive to operate the relay in the presence of synchronizing pulses.

3. The invention set forth in claim 1 including:

(a) a source of pulses that are synchronized and in predetermined phase relationship with the voltage of said electric power source.

(b) said switching circuit including a reed relay in series with the gate terminal of the first controlled rectifier, said reed relay being under control of the pulse source for being closed in predetermined phase relationship with the voltage of said electric power source that is applied to the anode of said first controlled rectifier, (c) a D-C voltage source connected to apply a voltage to the gate terminal of said first controlled rectifier through said reed relay, whereby to initiate an exposure interval, (d) an X-ray exposure interval timer means, (e) means that are controlled by said interval timer means for simultaneously opening said reed relay and applying a trigger signal to the gate of the second controlled rectifier at the end of an exposure interval, whereby to terminate both conduction of the first controlled rectifier and the exposure interval.

4. An X-ray exposure interval timing circuit comprising:

(a) at least a pair of first controlled rectifiers which are connected in inverse parallel relationship with each other and each of which has anode, cathode, and gate terminals, (b) a pair of inductors in series with each other and connected between opposite polarity terminals of the inversely connected controlled rectifiers, (c) a power supply transformer and an X-ray transformer connected in series with each other and having their opposite ends connected respectively to one junction of the inverse parallel arrangement of the controlled rectifiers and to the junction between the inductors, (d) a second controlled rectifier and a capacitor in series therewith connected in parallel with each of the first controlled rectifiers, each of the last-named controlled rectifiers having anode, cathode, and gate terminals, (e) a D-C source connected to charge each capacitor, (f) a switching circuit adapted to apply a control signal to the gate terminals of the first controlled rectifiers to initiate an exposure signal and to remove said control signal and apply a second control signal to the gate terminals of said second controlled rectifiers, whereby to render the latter conductive for applying the voltage on the capacitors across the first controlled rectifiers to reverse bias the same and terminate both load current flow and the exposure interval.

References Cited

UNITED STATES PATENTS 3,322,949 5/1967 Smith ---------------- 250—100

OTHER REFERENCES

General Electric Controlled Rectifier Manual, 1st ed., copyright 1960 (pp. 72 and 73).

RALPH G. NILSON, *Primary Examiner.*

S. C. SHEAR, *Assistant Examiner.*

U.S. Cl. X.R.

250—102